United States Patent [19]

Talmadge

[11] Patent Number: 4,909,064
[45] Date of Patent: Mar. 20, 1990

[54] IMPULSE CALIBRATION OF MECHANICAL TO ELECTRICAL TRANSDUCERS

[75] Inventor: Richard D. Talmadge, New Lebanon, Ohio

[73] Assignee: The United States of America as represented by the Secretary of the Air Force, Washington, D.C.

[21] Appl. No.: 222,694

[22] Filed: Jul. 22, 1988

[51] Int. Cl.⁴ .............................................. G01L 27/00
[52] U.S. Cl. ....................................................... 73/4 R
[58] Field of Search ............ 73/1 DV, 4 R, 4 D, 4 V; 381/58; 367/13

[56] References Cited

U.S. PATENT DOCUMENTS

| | | | |
|---|---|---|---|
| H413 | 1/1988 | Lelie | 381/58 |
| 2,539,418 | 1/1951 | Grogan | 73/4 R |
| 3,224,246 | 12/1965 | Schloss et al. | 73/1 |
| 3,281,543 | 10/1966 | Clay et al. | 179/175.1 |
| 3,548,631 | 12/1970 | Farmer et al. | 73/1 |
| 3,659,255 | 4/1972 | Trott | 340/5 C |
| 3,744,294 | 7/1973 | Lewis et al. | 73/1 DV |
| 4,051,712 | 10/1977 | Zias et al. | 73/4 R |
| 4,209,672 | 6/1980 | Nitta et. al. | 367/13 |
| 4,326,416 | 4/1982 | Fredberg | 73/597 |
| 4,486,862 | 12/1984 | Wyber | 367/13 |
| 4,768,379 | 9/1988 | Arcas et al. | 73/588 |

Primary Examiner—Robert R. Raevis
Attorney, Agent, or Firm—Gerald B. Hollins; Donald J. Singer

[57] ABSTRACT

A wide frequency spectrum mechanical impulse calibration apparatus for a microphone or other pressure wave to electrical signal transducer apparatus is disclosed. Calibration is accomplished using the Fourier series based transfer function of the transducer as obtained from its response to a time domain mechanical impulse input signal. Details of a mechanical impulse signal source, an improved time gated signal processing arrangement, and exemplary calibration signals are also disclosed.

11 Claims, 7 Drawing Sheets

IMPULSE SIGNAL SOURCE

FORCE

RESPONSE

TIME DOMAIN WINDOW

WINDOWED FUNCTIONS

TRANSFER FUNCTION

IMPULSE CALIBRATION OF MECHANICAL TO ELECTRICAL TRANSDUCERS

RIGHTS OF THE GOVERNMENT

The invention described herein may be manufactured and used by or for the Government of the United States for all governmental purposes without payment of any royalty.

BACKGROUND OF THE INVENTION

This invention relates to the field of calibrating microphones or pressure transducers or similar apparatus.

In the calibration of devices which are commonly called microphones and involve acoustic signal pressures in the range of one pound per square inch and lower values, and also in the calibration of pressure to electrical transducer elements, involving input pressures above one pound per square inch, it has been common practice to employ sinusoidal excitation of the device being calibrated, with the frequency of the sinusoid being altered either manually or automatically. Although calibrations performed in this manner may be made as accurate as desired and usually involves a minimum of complex theory and calculations, the time and apparatus required in performing such calibration can detract from their practical utility especially in the field or in other non laboratory situations.

Nevertheless there is found to be an ongoing and, in fact, increasing need for a calibration arrangement which can be accomplished quickly and with reasonable accuracy. It is especially desirable that a usefuL calibration arrangement avoid the tedium and expense of point by point sinusoidal comparisons while also providing a capability for use with a variety of transducer amplitude and frequency response ranges. It is also desirable for the calibration arrangement to accomodate microphones and pressure transducers (hereinafter transducer under test devices) which are of a variety of physical sizes including the miniature devices frequently mounted on or near the moving element of an apparatus.

In addition to sinusoidal calibration apparatus, the prior art calibration devices include such arrangements as a motor driven piston exciter and an impulse apparatus of the type wherein a diaphram covering a reservoir of compressed gaseous fluid is suddenly ruptured and other valving arrangements wherein a test chamber is exposed to a region of differential fluid pressure.

The prior patent art sinusoid and sinusoid-like calibration apparatus include U.S. Pat. Nos. 3,224,246; 3,281,543; 3,548,631; 3,659,255; and 3,744,294. In addition, the patent art also includes the patent of A. R. Zias et al, U.S. Pat. No. 4,051,712 which describes a pressure reference signal generator capable of establishing known reference input pressures for a transducer device in order to accomplish an automatic calibration sequence. The Zias et al apparatus is, however, especially concerned with providing long duration signals capable of calibrating the offset characteristics of a transducer.

SUMMARY OF THE INVENTION

The present invention provides a transducer calibration arrangement that is based on the unit impulse input signal.

The theory supporting use of an impulse signal, a signal of infinite amplitude and infinitely small time duration, has origins in classic mathematical theory as is explained in numerous mathematical, electrical network and other textbooks, including the text "Information Transmission Modulation and Noise" by Mischa Schwartz, published by Mc Graw Hill Book company, Inc., in 1959. Pages 37 and 56+ of the Schwartz text are especially concerned with the unit impulse signal. As indicated in FIG. 2–34 at page 57 of the Schwartz text, the ideal unit impulse signal of infinite amplitude and zero time duration can be shown to include sinusoidal frequency components of equal amplitude and spectrum extending to plus and minus infinite frequency values. The disclosure of the Schwartz text is hereby incorporated by reference into the present specification.

As further explained at page 58 of the Schwartz text, the use of a unit impulse function, or more practically, a good approximation of the unit impulse function, is equivalent to simultaneously impressing upon an apparatus under test an array of signal sources covering all possible frequencies with all of the sources also having equal amplitude and phase characteristics. A signal source of this type therefore enables determinations of frequency response and phase response of a device under test in the simplest of manners since variations in amplitude or phase at the output of the device under test can be attributed to the tested device itself.

An object of the present invention therefore is to provide an improved arrangement for the amplitude and phase calibration of microphones, pressure transducers and similar devices wherein the calibrating signal is in the nature of a unit impulse signal.

It is another object of the invention to provide a transducer calibration apparatus which is faster and easier to use than heretofore employed calibration devices.

It is another object of the invention to provide a unit impulse signal source apparatus which is useful in the calibration of transducer devices.

It is another object of the invention to provide a signal processing arrangement which is usable with an impulse signal source apparatus for calibrating transducer devices.

It is another object of the invention to provide a unit impulse exciting apparatus in which the nature of the employed unit impulse signal can be determined from a plurality of different input signal sensing arrangements.

It is another object of the invention to provide improved transducer calibration signal processing arrangements wherein the effect of acoustic echos is reduced or eliminated.

It is another object of the invention to provide for the processing consideration of predetermined transducer output signal portions without introducing frequency spectrum disturbance in the processed signal.

It is another object of the invention to provide a pressure transducer calibration arrangement in which input signal characterizing information originating in either a force measurement, an acceleration measurement or a pressure measurement may be utilized.

It is another object of the invention to provide a unit impulse excited transducer calibration arrangement in which the effect of acoustic echos and other signal imperfections is minimized or eliminated through the use of mathematically originated signal processing arrangements.

Additional objects and features of the invention will be understood from the following description and the accompanying drawings.

These and other objects of the invention are achieved by the method for calibrating electrical response of an acoustic signal to electrical signal transducer device which includes the steps of exciting the transducer with a pressure impulse acoustic signal, segregating the acoustic echo free time portion of the transducer electrical output siganl from the echo encumbered electrical output signal time portion, determining the Fourier transform frequency components of both the pressure impulse signal and the electrical output signal over a predetermined range of Fourier frequencies and computing the electrical signal output to acoustic pressure input frequency response function of the transducer at each Fourier frequency in the range of Fourier frequencies.

DETAILED DESCRIPTION

Figure 1:
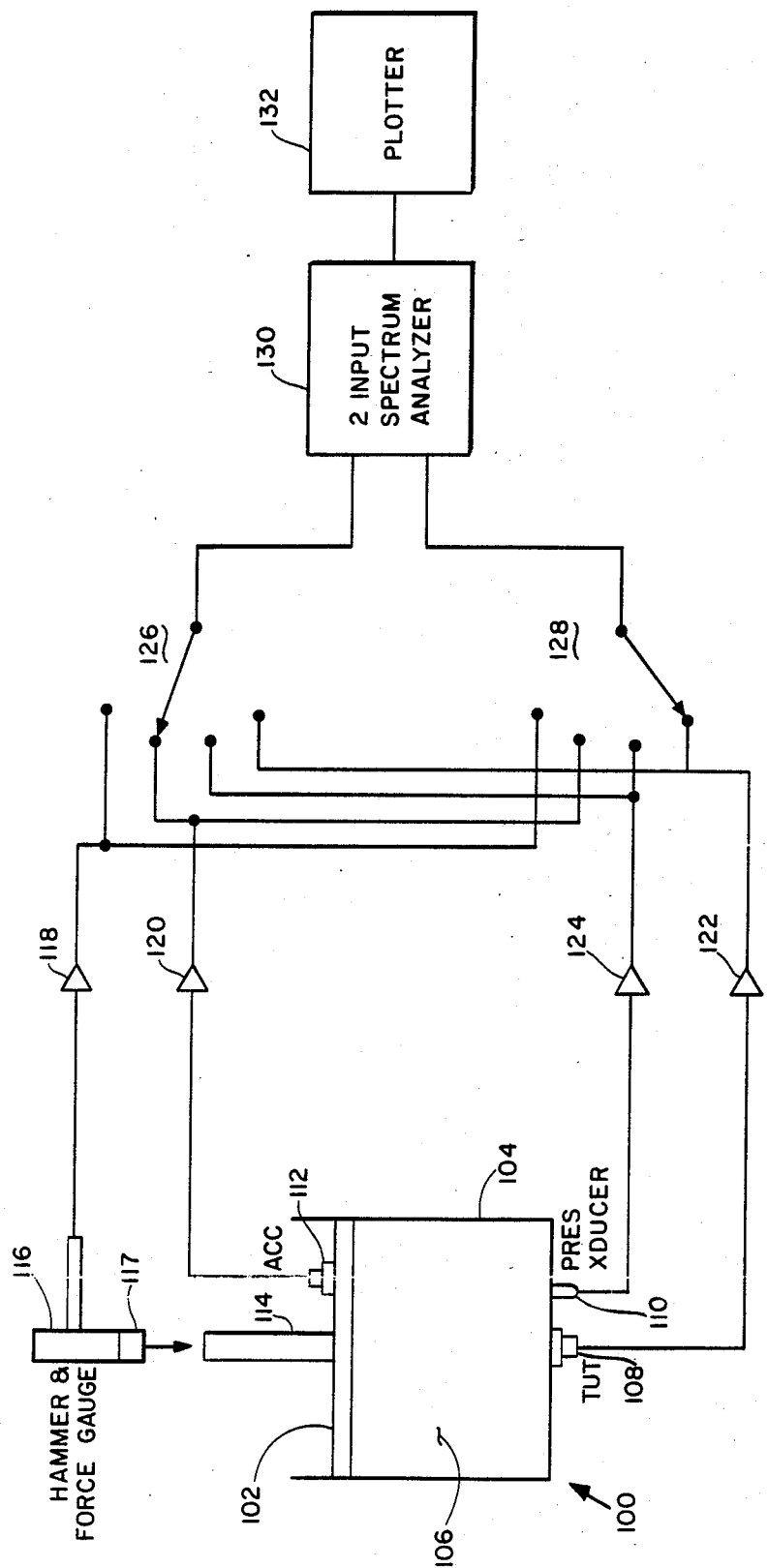
FIG. 1 is a block diagram of a transducer calibration apparatus made in accordance with the invention.

FIG. 1 in the drawings shows in schematic form the elements of a transducer calibration apparatus that is made in accordance with the inventions. In FIG. 1, an impulse signal source 100 is used to provide an acoustic signal to a microphone transducer under test 108. Signals the from the transducer under test device 108 and signals representing the generated impulse function are amplified and selected by a switching network for the additional processing described subsequently herein. Generally, the acoustic input signal for the transducer under test 108 is generated by movement of the piston member 102 within a cylinder member 104 in response to the striking of a piston connected anvil member 114 by a hammer 116. The FIG. 1 illustrated hammer 116 includes a striking or face portion into which is incorporated a hammer force measuring guage 117 for providing an electrical signal representative of the hammer generated force.

The amplitude, time duration, and other characteristics of the acoustic input signal generated by striking of the anvil 114 by the hammer 116 may be. determined from one or more of the plural transducers included in the FIG. 1 impulse signal source, that is, from the gauge 117 associated with the hammer 116, or from the accelerometer 112 mounted on the piston 102 or from the standard pressure transducer 110. Each of these devices is capable of generating an electrical signal that is characteristic of the pressure wave generated in the confined media space 106 of the cylinder 104.

Electrical signals originating in the gauge 117, the accelerometer 112, the transducer under test 108, and the standard pressure transducer 110 are increased in amplitude in the amplifier circuits 118, 120, 122 and 124 in FIG. 1/. Preferably these amplifiers are disposed in a location physically close by the impulse signal source 100 in order that the signal levels resulting be convenient for switching and noise free transmission to a two input spectrum analyzer or other computerized waveform analysis apparatus-apparatus which is indicated at 130 in FIG. 1. The waveforms obtained from signals originating in the impulse signal source 100 and the spectrum analyzer 130, that is, waveforms of the type shown in FIG. 4-12 herein are represented on a plotter 132 in FIG. 1; the plotter input is connected to the spectrum analyzer 130.

The multiple position switches 126 and 128 allow selection between the several possible pairings of signals originating in the impulse signal source 100 in FIG. 1. The switches 126 and 128 are presumed to be individually selectable, that is, not mechanically connected together, in order that the possible selection of signal pairs include all combinations. The nature of the siganl processing accomplished in the spectrum analyzer 130 includes Fourier transformation of the selected input signals and other signal processing as is described below herein. A more complex waveform analysis apparatus could, of course, be employed to simultaneously receive signals from each of the sources 117, 112 and 110 and 108 in FIG. 1 and to coincidentally, display these signals on a plotter 132 or other display apparatus.

Figure 2:
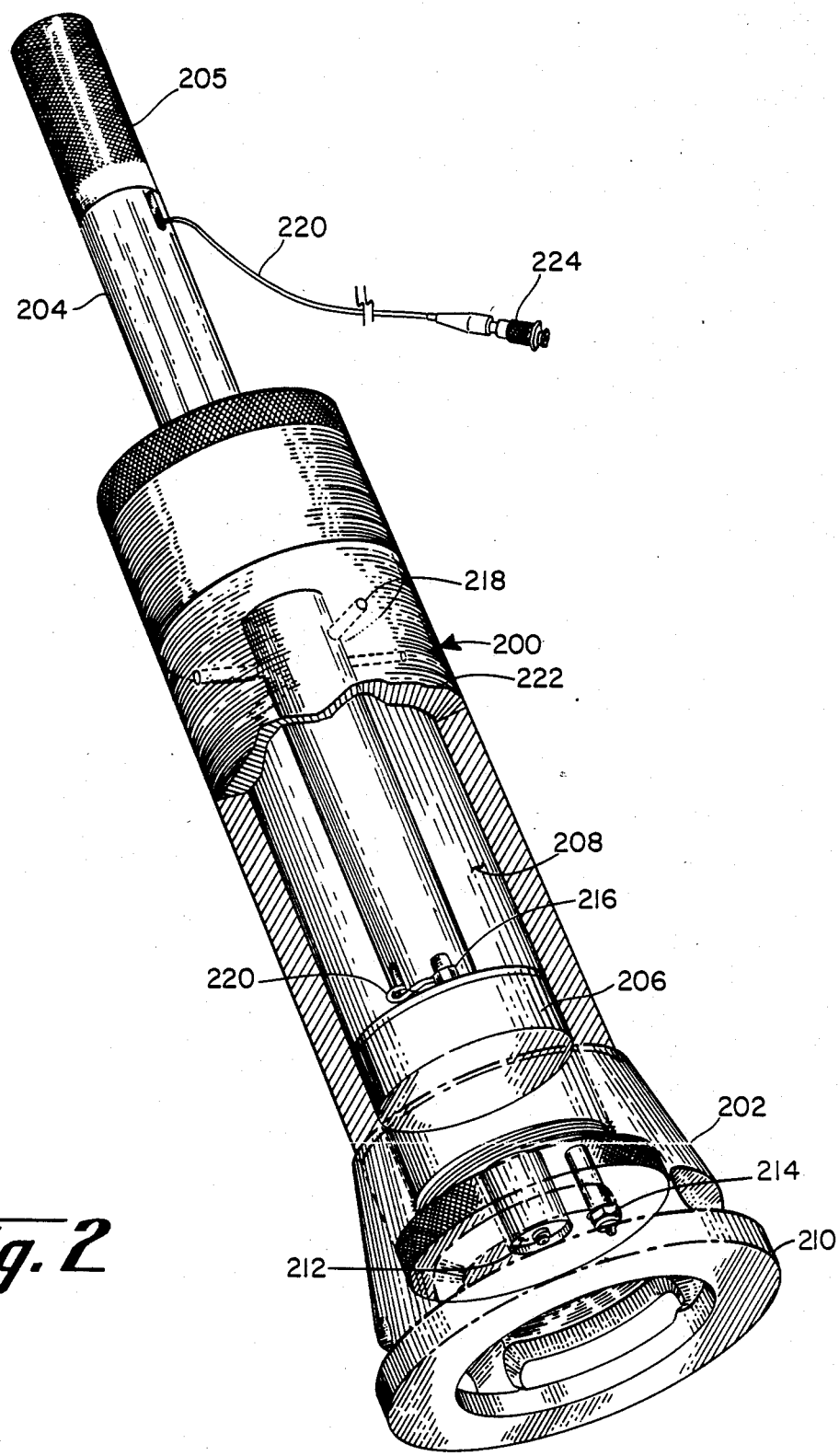
FIG. 2 is a cutaway perspective view of an impulse signal sourcing apparatus usable for transducer calibrations signal sourcing in accordance with the invention.
Figure 3:
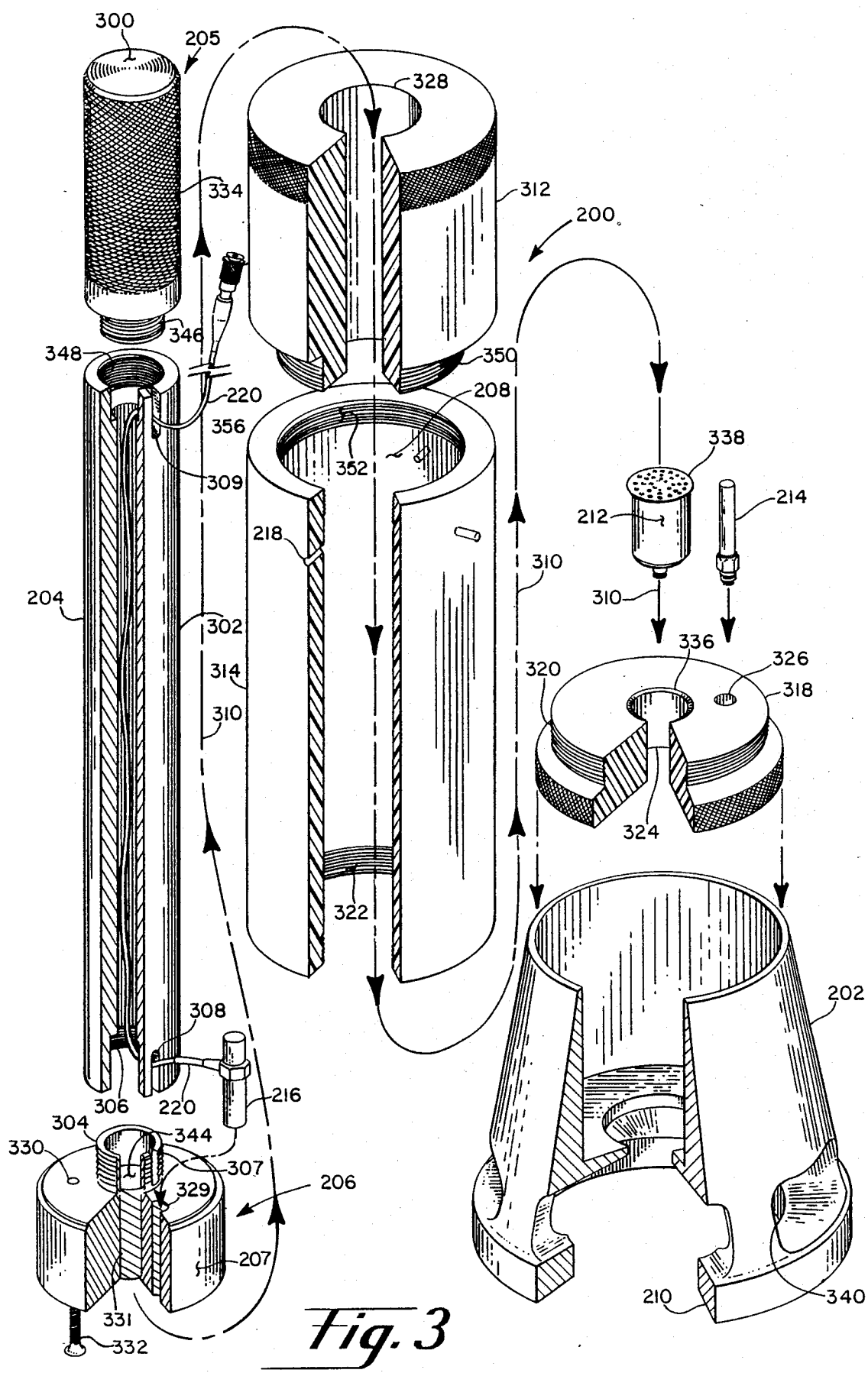
FIG. 3 is a exploded and cutaway view of the FIG. 2 apparatus.

FIG. 2 and 3 of the drawings show details of an impulse signal source 100 in FIG. 1—a cutaway oblique view in FIG. 2 and a cutaway exploded view in FIG. 3. In the FIG. 2 and FIG. 3 apparatus, which use the same identification numbers whenever possible, a movable piston 206 is shown to be received in a cylinder assembly 200. The piston 206 is received on the smooth and preferably machine finished interior surface 208 of the cylinder 200. The rod member 204 connects the piston 206 with an anvil member 205 and communicates force received by the anvil member to the piston 206. A transducer 216, which is of the accelerometer type and was indicated at 112 in FIG. 1, is mounted on the piston 206 and is connected to an external signal utilization apparatus by way of a tether cord 220 and an electrical connector 224.

The transducer under test, which was indicated at 108 in FIG. 1 is shown at 212 in the impulse signal source of FIG. 2 and 3 while the pressure transducer 110 in FIG. 1 is shown at 214 in FIG. 2 and 3. The FIG. 2 and 3 impulse signal source apparatus is maintained in the upright position during use by a mounting receptacle 202 which includes a flattened annular base portion 210 that is receivable on a horizontal surface such as a table or the floor. A series of pressure relief holes 218 are disposed in the upper region of the cylinder assembly 200 in order that the region above the piston 206 remain essentially at atmospheric pressure rather than at a negative pressure during use of the FIG. 2 and 3 apparatus. The cylinder assembly 200 may be fabricated from a variety of different materials, however, a clear plastic of the type used in aircraft windshields and having substantial thickness as is indicated at 222 in FIG. 2 is preferred. A polycarbonate material which as Lexan ™ is suitable for the cylinder of the assembly 200.

In the FIG. 3 drawing, additional numbers in the 300 series are added as needed for description of details best observed in the FIG. 3 drawing. In the FIG. 3 drawing, the anvil member 205 is shown to be fabricated from a single or integral piece of metal and may be, for example, made from aluminum. The anvil number 205 includes a flattened top surface 300, a knurled or otherwise finished lateral surface 334 and a reduced diameter threaded region 346 which engages a complementary threaded region 348 in the shaft portion 302 of the connection rod member 204. At the lower end of the shaft portion 302 is also disposed a threaded region 306 which engages a complementary threaded region 304 on the movable piston member 206. A series of slots 307, 308 and 309 are disposed in the threaded regions in order to admit the tether cord 220 which connects with the accelerometer transducer 216. In the arrangement shown in FIG. 3, the illustrated relative sizes of the slots 307, 308, and 309 dictate threading of the tether cord 220 prior to attachment of the electrical connector 224; other arrangements are, of course, possible.

The piston 206 in the FIG. 3 drawing is shown to include a sequence of apertures or holes 329, 330, and 331 in which is received the accelerometer transducer 216, the aperture closing machine screw 332 and a plug member 344 respectively. The piston 206 is also preferably made from aluminum with appropriate machining operations to achieve the illustrated detail features and a tight but non-binding relationship with the cylinder surface 208.

the cylinder assembly 200 is shown in FIG. 3 to be comprised of the annular central portion 314, a top cap portion 312, and a lower plug member 318. The top cap portion 312 includes an aperture 328 in which is received the connection rod member 204 and also includes a threaded lower region 350 which engages a complementary set of threads 352 in the annular cylindrical central portion 314.

The lower aperture of the annular cylindrical central portion 314 is closed by the plug member 318 using the mating threads 320 and 322. The plug member 318 includes the apertures 326 and 324 for receiving the transducers 214 and 212 respectively. A beveled or counter sunk area 336 at the top of the aperture 324 mates with a similar shaped flange 338 on the transducer under test 212.

The entire cylinder assembly 200 is received in the mounting receptable 202 which holds the assembly in a vertical position convenient for use or storage. The mounting receptable 202 includes cutaway regions 340 through which the electrical leads coupled to the transducers 214, 212, and 214 may be threaded. The curving line 310 in FIG. 3 indicates the assembled positions of the impulse signal source elements without concern for the required order of assembly thereof. The anvil 205, for example, must be passed upwardly through the top cap portion 312 rather than downward as implied by the line 310 during assembly of the FIG. 3 apparatus.

The piston 206 in FIG. 3 is preferably provided with a smooth cylindrical exterior surface 207 having operating clearances that are in the range of two thousandths of an inch (0.002 inch) with the cylinder surface 208. Clearances in this range are sufficient to minimize frictional forces between the piston 206 and the cylindrical surface 208 while also being small enough to retain the piston and anvil assembly in an essentially steady state condition just prior to hammer impact and provide minimal effect on the impulse pressures generated by the piston. Air or another gaseous media is desirably used in the region between the piston and the transducers 212 and 214 in the FIGS. 2 and 3 apparatus. Air is the preferred media for use in this region since most transducers being calibrated are intended for use in an air environment. The use of water or other non compressible fluids between the piston 206 and the transducers 212 and 214 is, of course, feasible in the FIGS. 2 and 3 apparatus when dictated by the acoustic properties under consideration.

The hammer to be used with the FIGS. 2 and 3 apparatus is indicated at 116 and 117 at FIG. 1 of the drawings but is not shown in greater detail in FIGS. 2 and 3 of the drawings. A hammer suitable for use with this use may have a weight of 0.3 lbs. and may be of any convenient shape. This hammer is additionally fitted with an impact force measuring transducer as indicated at 117 in FIG. 1. Suitable hammer and hammer force transducer devices are manufactured by PCB Piezotronics, Inc., located in Depew, N.Y.

The transducer under test 108 in FIG. 1 or 212 in FIGS. 2 and 3 may typically be a Kistler Model 211B5, the reference transducer or microphone 110 in FIG. 1 or 214 in FIGS. 2 and 3 may be a Gulton Type MA299507 device which commonly has a sensitivity of 5.7 millovolt RMS at 124 dB Sound Power Level and 250 hertz. The accelerometer 112 in FIG. 1 or 216 in FIGS. 2–3 may be Vibra Metrics, Inc. model M-1000-8A which typically has a flat response plus or minus 2dB from 1.4 hertz to 10 kilohertz. The force gauge 117 in FIG. 1 may be a PCB Model 208A03.

SIGNAL PROCESSING

Figure 4:
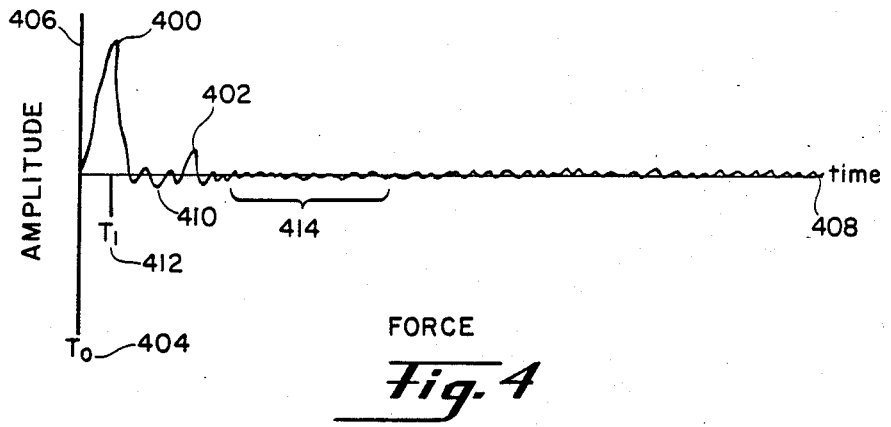
FIG. 4 is a possible input signal waveform usable for transducer calibration.

FIG. 4 in the drawings shows a typical waveform to be expected from the force gauge 117 in FIG. 1 during the striking of anvil member 114 by a hammer member 116. In FIG. 4, the waveform 410 represents a plot of hammer force amplitude measured along the axis 406 vs. elapsed time measured along the axis 408. Time measurements commence with the time To indicated at 404 in FIG. 4. The time To represents the first discernible departure of the force waveform from its zero quiescent value. The peak value 400 in the waveform 410 occurs at time $T_1$ following a period of force rise time which occurs in the time interval between $T_0$ and $T_1$. The peak force value at 400 at FIG. 4 might represent, for example, a force value of 100 pounds. A secondary and lower amplitude force peak can be expected to occur with the FIGS. 1–3 apparatus as a result of apparatus resilience and a tendency for the hammer 116 to bounce following the initial impact with the anvil 114. The appearance of this bounce event is indicated at 402 in FIG. 4. As indicated at 414 of FIG. 4 a pattern of acoustic echo and small amplitude force undulation can also be expected in the FIGS. 1–3 apparatus.

Figure 5:
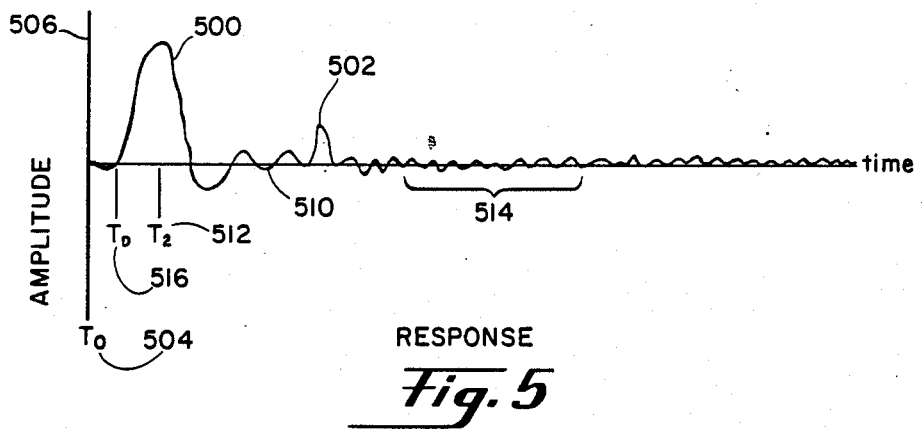
FIG. 5 shows a transducer output signal response to the FIG. 4 waveform.

The response of a microphone or transducer under test to the force signal of FIG. 4 is indicated in FIG. 5 of the drawings and comprises a waveform 510 having general similarity to the waveform of FIG. 4 except for a period of time delay $T_D$, 516 during which the acoustic wave generated by the hammer 116 in FIG. 1 propagates through the media of the space 106 to reach the transducer under test 108. A delay period similar to the time delay 516 is also present between the non-form peak times $T_1$ at 412 in FIG. 4 and $T_2$ at 512 at FIG. 5. Other aspects of the FIG. 5 waveform correspond to similar aspects fo the FIG. 4 waveform and are numbered with similar numbers excepting for the hundred digit of the number indicating FIG. 5 and the hundred digits in FIG. 4 indicating FIG. 4.

Figure 6:
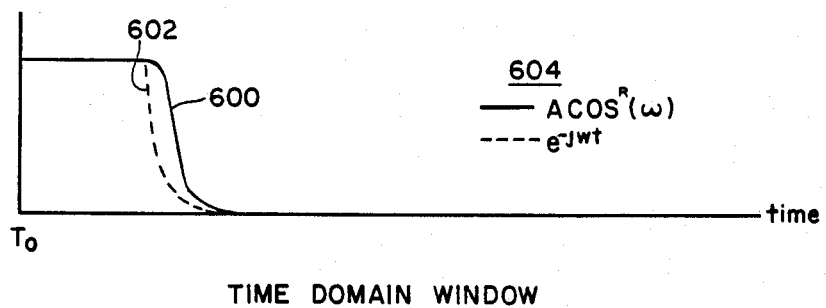
FIG. 6 shows a windowing or stroboscopic pulse usable in processing the FIG. 4 and 5 signals.

In order to exclude effects of the hammer bounce secondary peak 402 and 502 in FIGS. 4 and 5 from the signal processing and from the calibration curve output of the FIG. 1 apparatus, it is desirable to employ a data windowing or stroboscopic function as a multiplying signal to be used with the signals of FIGS. 4 and 5. A windowing signal suitable for use with the waveforms of FIGS. 4 and 5 is shown in FIG. 6 of the drawings. The waveform 600 in FIG. 6 is a graphical representation of a mathematical cosine function while the waveform at 602 in FIG. 6 graphically represents a mathematical exponential function. The windowing functions shown in FIG. 6 are both of the origin centered type rather than of the more commonly used interval centered type. The origin centered window function is more useful for eliminating impulse function noise and additionally has the mathematical characteristic of spreading the spectral response of the windowed signal over a wider frequency band than does the interval centered widow—which tends to compress the spectral response or Fourier spectrum.

The mathematical nature of both the cosine and exponential window function is shown at 604 in FIG. 6 where the factor A is a scaler or amplitude adjusting factor for the cosine window function, the exponent R indicates the desired cosine function has a cosine squared or some greater than one exponent and the symbol $\omega$ is selected to accommodate the time duration of the pulses 400 and 500 in FIGS. 4 and 5. In a related manner the symbol e in the exponential window function in FIG. 6 indicates the base of the naperian logarithm, the symbol j represents the square root of minus one imaginary operator, and $\omega$ and t are again selected to accommodate the time duration of the desired data pulses at 400 and 500 at FIGS. 4 and 5.

Functions of the type shown in FIG. 6 are desirable for the stroboscopic or windowing function of the present invention because they minimally disturb the frequency composition of the waveform being processed or at least disturb this composition in a manner that is mathematically accountable or predictable, e.g. the above described spectral compression or expansion. The binary AND gate or square wave stroboscopic pulse commonly used in computer logic applications is undesirable for use in data windowing where frequency component aspects of the waveform are important since such window functions severely alter the frequency spectrum of the data under consideration. The two mathematical functions shown at 604 in FIG. 6 are merely examples of the windowing functions which may be employed with the present invention. Other mathematically based windowing functions are known and include other cosine based functions. Hamming window functions and others.

In the FIGS. 4–6 waveforms the window amplitude in FIG. 6 is set to a mathematical value of one commencing at time To and lasting until after the end of the initial waveform peak in order that the product of the window function and the FIG. 4 or FIG. 5 signal be the same as the original or input value of the FIGS. 4–5 signal.

Figure 7:
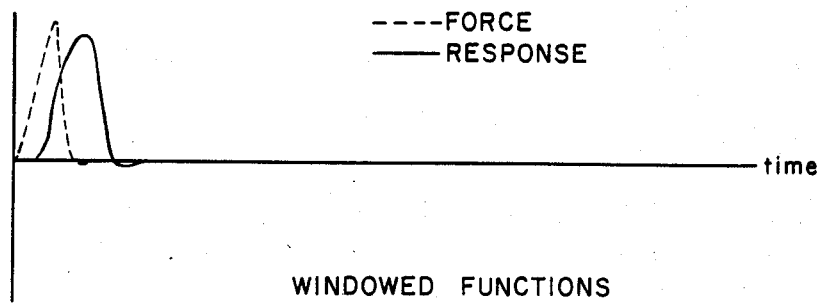
FIG. 7 shows the results of the FIG. 6 windowing or stroboscopic pulse on the FIG. 4 and 5 signals.

FIG. 7 in the drawings shows the data peaks occuring at 400 and 500 in FIGS. 4 and 5 respectively following their processing with the window functions of FIG. 6. The tapered trailing edge of the FIG. 6 window function signals serve the useful purpose of forcing the FIG. 7 processed signal to a value of zero according to an orderly and mathematically predictable amplitude algorithm; the window function of FIG. 6 does not, however, timewise alter the FIG. 4 and FIG. 5 data signals or their amplitude peaks.

The FIG. 7 transducer input and output signal data is subjected to Fourier transform processing in the spectrum analyzer 130 in FIG. 1. This processing includes computing the Fourier transform of the input signal and the Fourier transform of the output signal followed by a complex conjugate multiplication of the transformed input and output signal to form the cross power spectral density function. The cross power spectral density function, when divided by the Fourier transformed input signal or force power spectrum, produces the frequency response function of the transducer under test. The Fourier transform of the transducer under test input or output signal, in effect, indicates the energy per frequency of the transformed time domain signal.

The term "transfer function" is generally understood to relate to the mathematical ration of output signal to input signal for a device under test; according to a more rigorous treatment of such considerations, however, the term "frequency response function" (FRF) is preferable and is considered to be the ratio of the cross power spectral density divided by the force power spectrum. This concept is discussed in numerous advanced mathematics and engineering textbooks including the text "Engineering Applications of Correlation and Spectral Analysis" authored by Julius S. Bendat and Alan G. Piersol and pubished by John Whiley & Sons of N.Y., Chichester, Bisbayne and Toronto, pp. 17, 86, 88, 103 and 151 of the Bendat and Piersol texts are especially relevant to the present document. The disclosure of the Bendant and Piersol tests is hereby incorporated by reference herein.

The block 130 in FIG. 1 therefore indicates one arrangement for performing the Fourier transformation of the transducer input and output signal information. The spectrum analyser of block 130 is a well known piece of laboratory apparatus. As commonly embodied, spectrum/analysers use digital processing wherein the input signal is converted to a digital form using an analog to digital converter and employing, for example, a signal amplitude resolution of 128 or 256 discrete amplitude levels. Fourier series coefficient computations follow each of the analog to digital data sample conversions. The spectrum analyser 130 in FIG. 1 may be embodied as the Model 3582 analyzer manufactured by Hewlett Packard Corporation of Palo Alto, Calif., or as the Model 5820 analyzer manufactured by Wavetek Rockland Scientific Inc., of Rockleigh, N.J. or other similar apparatus. Spectrum analyzers of this type are generally not provided with the ability of performing the above described data windowing function and, thereby, require that this function be performed by an additional apparatus or by manual mathematical manipulation.

An improved arrangement for the spectrum analyser 130 includes the use of a general purpose computer provided with software enabling performance of both the windowing function and the Fourier transform function described above. Software that is generally available in the commercial software market is capable of performing this function. Another improved arrangement for performing the spectrum analyzer function 130 is to be found in the spectrum analyzer instruments such as the Hewlett Packard model 3562A apparatus that is described on page 148 of the Hewlett Packard Corporation 1988 catalog or in the Japanese made ONO SOKKI type CF 910 Dual Channel FFT analyzer. These types of spectrum analyzers provide internally generated windowing functions of the above described interval centered type and are also provide with a computer input port capability for receiving externally generated windowing functions such as the desired origin centered function.

The Frequency Response Function of the transducer under test is in itself a suitable definition of transducer characteristics for many transducer utilizations. Further processing of the FRF information will however provide the conventional calibration curve for a transducer under test. The further processing may also remove propagation delay effects by recognizing that such delay translates to a linear change in phase angle with respect to frequency and can therefore be removed by linear regression methods including slope determination or by measuring the time delay between input and output signals of the transducer under test followed by calculation of the slope of the phase curve and subtraction of the phase curve from the transfer function.

Figure 8:
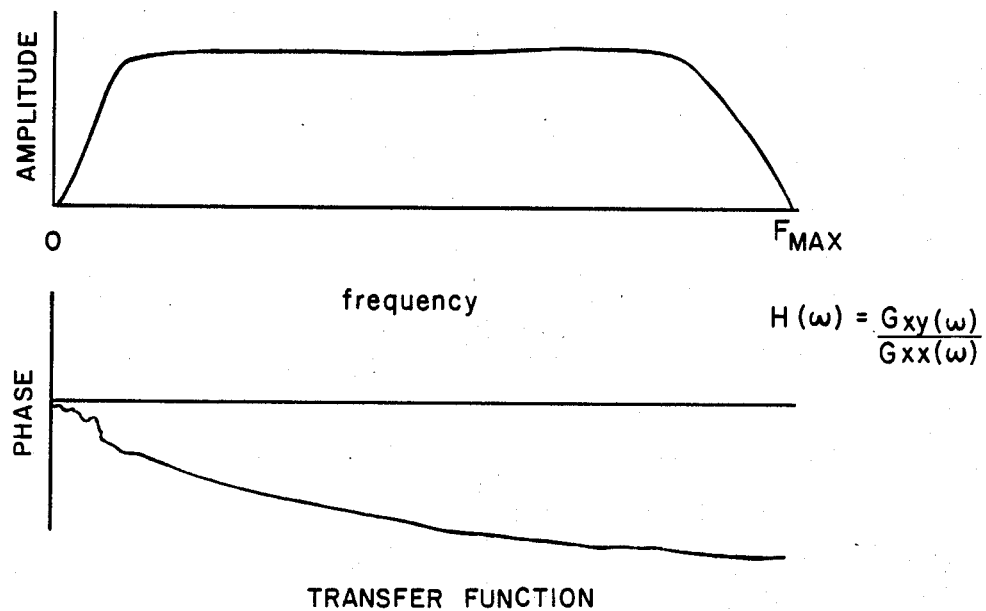
FIG. 8 is a representation of the amplitude phase and frequency characteristics of a typical calibrated transducer device.

FIG. 8 in the drawings shows FRF amplitude vs. frequency and transfer function phase angle vs frequency relations for a typical pressure to electrical signal transducer device of the type identified herein. The generalized equation for such a FRF is also indicated in FIG. 8.

A relating of input signal force, that is force measured with the transducer 117 in FIG. 1, to pressure in the media space 106 or alternately signals relating piston acceleration, as measured with the accelerometer 112 to pressure in the confined media space 106 may also be obtained by signal processing in the computer embodiment of the spectrum analyser 130. Conversion from acceleration measurements as provided by the accelerometer 112 to a piston velocity measurement involve the mathematical integration operation which is known in the art. Since these pressure relating processes are scaler in nature, their performance at the completion of a testing sequence rather than before the transsfer function computation is a calibration convenience and moreover can be performed as a process average computation rather than as a part of each individual calibration run. Processing of this type is performed at the commencement of a calibration sequence and must be performed with every data acquisition session.

By way of clarification, it should be understood that the present disclosure contemplates three alternate utilizations of the FIG. 1–3 apparatus in arriving at the calibration of a transducer. These three utilizations concern the different arrangements, for using the impulse function generated by the hammer 116 to anvil 114 impact in the FIG. 1 apparatus and are briefly described as follows:

1. Use of the impact generated pressure impulse signal as a common excitation source for both a standard transducer and a transducer under test—calibration in this instance consists of comparing the output signals from the two transducers—with departures of the transducer under test signal from the standard transducer signal and the known characteristics of the standard transducer together indicating the true response of the transducer under test. This "reference calibration" technique is a somewhat elementary use of the impulse concept.

2. Use of the impulse of pressure as a transducer under test stimulus signal—an arrangement wherein the measurement of hammer force is used as a tool for defining the pressure impulse; in this instance calibration of the transducer under test involves determination of its frequency response function using the mathematically defined pressure impulse. This arrangement may be designated as a force measurement converted to pressure technique.

3. Use of the impulse of pressure as a transducer under test stimulus signal in an arrangement wherein piston acceleration as a result of the hammer blow is measured by an accelerometer—with mathematical integration of the acceleration function providing a velocity function that defines, using the equation $P = VpC$ recited below, the pressure impulse applied to the transducer under test. In view of the good traceability between the apparatus of this arrangement and standards of the National Bureau of Standards, this acceleration based or acceleration converted to pressure calibration is preferable from an accurary or traceability standpoint.

The FIG. 1–3 impulse apparatus by way of incorporating the force guage 117, the accelerometer 112, and the pressure transducer 110 is capable of signal generation for each of these three arrangements.

EXAMPLES

The Sound Power Level (SPL) to be expected from the hammer to anvil impact described in FIGS. 1–3 herein may be determined from a series of calculations. First, a relationship between piston motion and achieved Sound Power Level for an apparatus of the FIG. 2 and 3 type can be developed by first considering the resonant frequencies of a closed cylindrical cavity:

$$f = C/2[(N/L)^2 + (\alpha mn/r)^2]^{0.5} \text{ (Hz)}$$

where:
L = length of cavity (inches)
N = mode integer in axial direction
α = mode-dependent coefficient for tangential & radial modes
r = radius of cylinder (inches)
C = speed of sound = 1117 ft./sec.

For a plane wave only:

$$m = 0, n = 0, \alpha = 0$$

Then: $f = CN/2L$ (Hz)
For N = 1, the lowest resonant frequency:

$$f = C/2L \text{ (Hz)}$$

Letting L = 2 inches and assuming room temperature:

$$f = 1117/2(2)/12 = 3351 \text{ Hz}$$

This value of resonant frequency is laboratory verifiable.
Considering then the excitation amplitude-the impulsive force is given by:

$$F_I = \int \Delta F \, dt$$

For a hard surfaced piston and cylinder, a constant force applied for a short time duration can be assumed. For constant force:

$$\int \Delta F \, dt = F \int dt = F(t_2 - t_1)$$

$$F_I = F \Delta t$$

The velocity of the piston after the impact is:

$$V = F_I/m$$

Where:
V = velocity
$F_I$ = impulsive force
m = mass
To find the mass:
Calculate volume of piston:

$$v = \pi r^2 d$$

Where:
v = volume
r = radius of piston = 1.00 inch
d = thickness of piston = 1.25 inches
So: v = 3.9. in$^3$
Volume of plunger rod, assuming a Lexan ® rod and:
r = radius of rod = 0.5 inch
d = length of rod = 14.5 inches
Total volume = volume of piston + volume of plunger rod = 15.315 in$^3$
Total mass is:

$$m = \rho v$$

Where: $\rho$ = density of Lexan ® = 18.72 lb/ft$^3$
So: m = 0.1659 lbm
Assuming t = 0.01 sec. and F = 15 lbs.
Then:

$$\begin{aligned} V &= F\Delta t/m \\ &= [(15 \text{ lbs})(.01 \text{ sec})/.1659125 \text{ lb.}][32.174 \text{ ft/sec}^2] \\ &= 29.088 \text{ ft/sec} \end{aligned}$$

Acoustic pressure is given by:

$P = V\rho C$ (from Structure-Borne Sound, by Cremer, Heckl, Uriges; p-459)

Where:
V = particle velocity
$\rho$ = density of air
C = speed of sound
This assumes that air particle velocity is the same as piston velocity.
Then:

$$\begin{aligned} P &= (29.088 \text{ ft/sec})(.002378 \text{ lb-sec}^2/\text{ft}^4)(1117 \\ &\quad \text{ft/sec})(\text{ft}^2/144 \text{ in}^2) \\ &= .536 \text{ psi} \end{aligned}$$

For SPL = 20 log P/P$_o$
Where:
P = 0.53 psi
$P_o = 2.9 \times 10^{-9}$
Then SPL-165 dB.

Since Lexan ® is found susceptable to impact force failure in the FIG. 2 and 3 apparatus and is desirably replaced with the aluminum structure specified above, the following corrections for an aluminum piston and plunger rod may be applied:
the $\rho$ of aluminum = 174.5 lbs/ft$^3$
And changing F = 100 lbs.
Then: V = 18.1 ft/sec.
Therefore: P = .334 psi
And the SPL = 161 dB.
Table I below illustrates the signals achieved with the FIG. 1-3 apparatus under plurality of signal collecting conditions including the use of water in the space 106 in FIG. 1.

TABLE I

|  | Microphone psi | Pressure Transducer | | Force lbs |
|---|---|---|---|---|
|  |  | SPL (dB) | psi | SPL (dB) |  |
| 1" piston height with air | .6126 | 166 | .6367 | 166 | ≈100 |
| 1" piston height with air and #36 hole through piston at 330 in FIG. 3 | .7146 | 167 | .6786 | 167 | ≈100 |
| 1" piston height with water in space 106 and #36 hole through piston | 3.55 | 181 | 4.14 | 183 | ≈10 |

Figure 9:
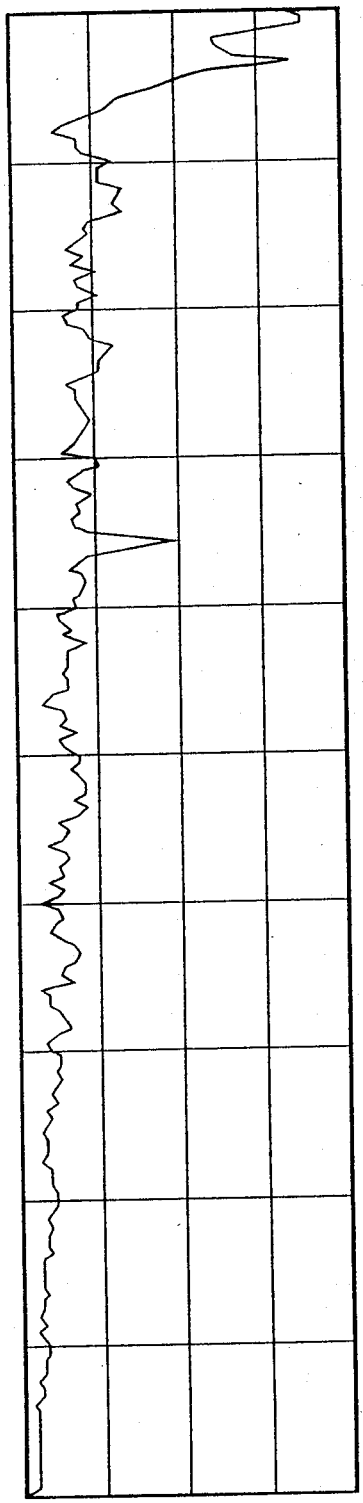
FIG. 9 is a coherence vs. frequency relationship for one unit impulse sampling arrangement usable in the present invention.
Figure 10:
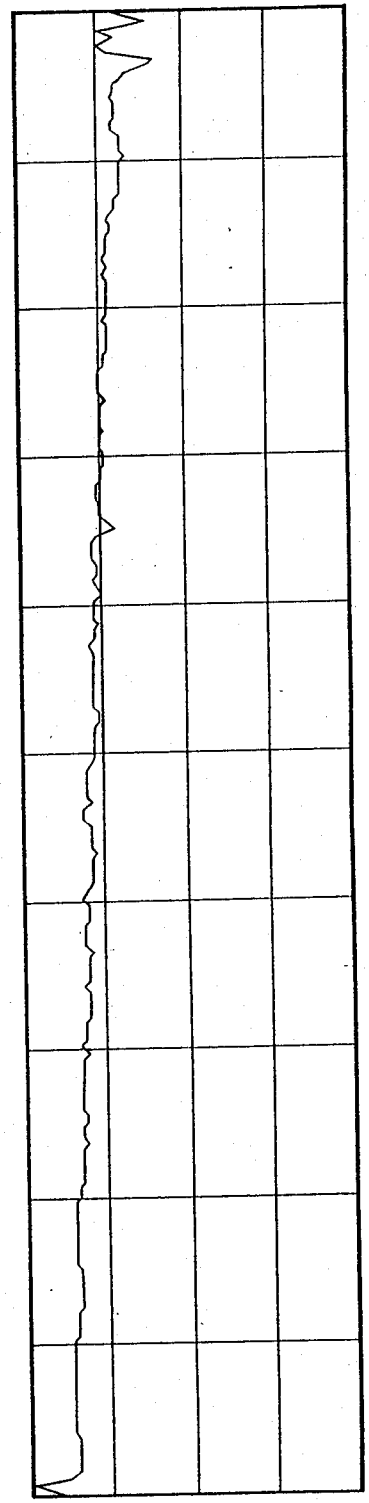
FIG. 10 shows a frequency plot of the frequency response function (FRF) for the FIG. 9 transducer device.

FIGS. 9 and 10 in the drawings illustrate the coherence function and the FRF or transfer function obtained in calibration of a pressure vs. electrical signal transducer device using a one inch stroke in the FIGS. 1-3 apparatus and input signal measurements accomplished by way of the accelerometer 112 in FIG. 1. The FIG. 9 drawing represents the coherence function plotted on a scale of 5.0 kilohertz, 0.5 kilohertz per division, in the horizontal direction and a scale of 0.1 in the vertical direction. The coherence funciton is obtained by squaring the cross power spectrum values and dividing by the product of the input power spectrum and the output power spectrum. A coherence value of 1 indicates that the pertinent cross power spectrum measurement contains a measurement of all the energy in the system under consideration; that is, that frictional and other loses are negligible. Under ideal conditons, the coherence function has a value of one and values other than one indicate energy loss at the frequency under consideration. In FIG. 9, for example, notable energy losses occur in the frequency ranges of 3.25 and 4.75 kilohertz.

A transfer function magnitude plot for the transducer of FIG. 9 is shown in FIG. 10 of the drawings; also, using a scale of 0 to 5 kilohertz along the horizontal axis and with a vertical scale of 5 dB per graduation.

Figure 11:
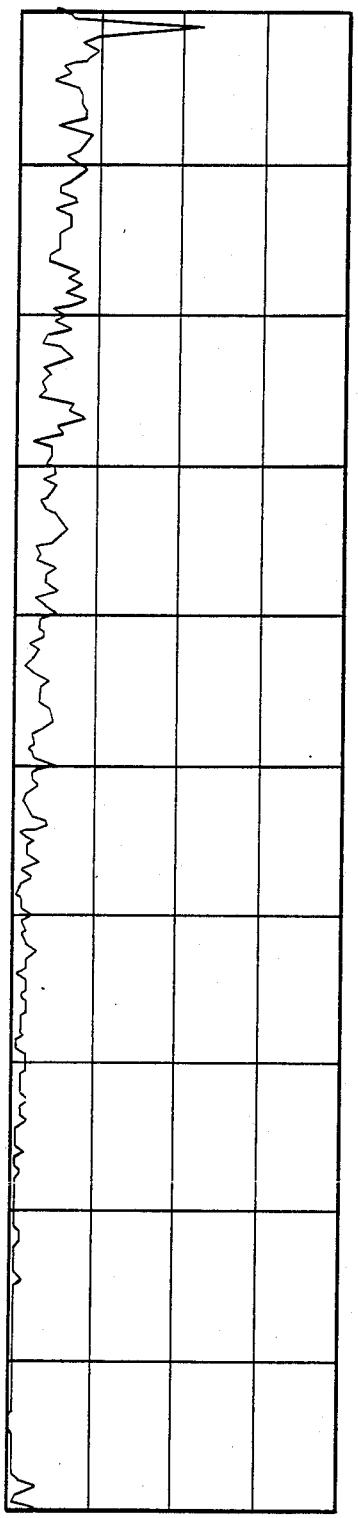
FIG. 11 is a coherence vs. frequency relationship for another unit impulse sampling arrangement usable in the present invention.
Figure 12:
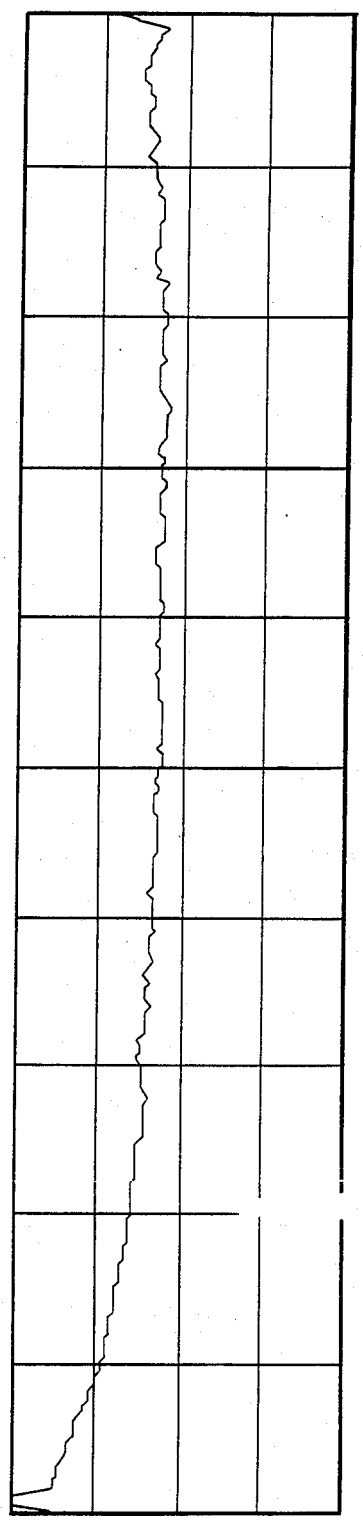
FIG. 12 shows the resulting FRF for the FIG. 11 described transducer device.

FIGS. 11 and 12 in the drawings show relationships similar to those of FIGS. 9 and 10 with the exception of the signal information being measured by way of a microphone or pressure transducer located as shown at 110 in FIG. 1 in the lower extremity of the space 106.

VARIATIONS

Numerous variations or modifications of the thus far described calibration arrangements are within contemplation of the invention. Among these variations are a plurarity of alternate transducer types and locations including mounting of the transducer under test on the piston 102 in FIG. 1 or a mounting of a transducer under test or the transducer 110 in laterally disposed or other locations within the media space 106. The use of vibration compensated transducers is desirable in versions of the apparatus which involve transducer mounting on the piston in order that ringing of the piston mass and the transducer following impact be excluded from the processed signals.

Also included in the possible variations of the invention are alternate arrangements for the pressure wave producing elements which have been disclosed in terms of a piston and hammer apparatus. Clearly alternate arrangements of an impact changable confined space may be envisioned by persons skilled in the art to achieve a sudden decrease of media space volume and an impulse pressure wave. A falling weight, for example, might be used in lieu of the hammer 116 in FIG. 1. Of particular interest in considering of alternate impact signals source apparatus is the tendency the FIG. 1-3 apparatus to limit the pressure impulse rise time to periods of four milliseconds and above. Since a pressure rise time of one millisecond is needed to produce a signal bandwidth between dc and one kilohertz the achievement of faster pressure wave rise times is desirable.

The above mentioned use of water in the media space 106 in FIG. 1 is illustrated in Table I above to provide large signals, SPL levels of 181 dB and signal rise times of 0.8 millisecond with relatively small hammer impact force, however, air media is to be preferred except for transducer devices intended for use in a liquid environment.

A scaling down of the physical size of the impulse signal source apparatus shown in FIGS. 1-3 from the two-inch piston diameter size heretofore contemplated and described in this document, will also add high frequency components to the impulse function and other benefits.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. A method for characterizing the pressure wave input to electrical signal output response of an acoustic signal to electrical signal transducer device comprising the steps of:
    exciting the transducer device with a mechanical impact pressure impulse acoustic signal;
    determining the waveform characteristics of said mechanical impact pressure impulse acoustic signal;
    segregating an acoustic echo free time portion of the transducer device pressure impulse input signal and electrical output signal waveforms fromt he echo encumbered portions of said signal waveforms;
    generating the Fourier transform frequency components of the segregated echo free pressure impulse transducer device input signal and electric output signal waveforms over a predetermined range of Fourier frequencies;
    computing from said Fourier transform frequency components an electrical signal output to acoustic pressure input frequency response function of said transducer device over said range of Fourier frequencies.

2. The method of claim 1 wherein said step of generating the Fourier transform frequency components includes determining from the acceleration response of a pressure impulse generating element the Fourier transform coefficients for said pressure impulse signal.

3. The method of claim 1 wherein said step of generating the Fourier transform frequency components includes determining from the electrical response of an accelerometer transducer element, disposed in communication with an element generating said impulse signal the Fourier transform coefficients for said pressure impulse signal.

4. The method of claim 1 wherein said step of generating the Fourier transform frequency components includes determining from the waveform of a mechanical impulse force signal the Fourier transform coefficients for said pressure impulse signal.

5. The method of claim 1 wherein said segregating step includes time gating said transducer device pressure impulse and electrical output signals with a data window signal of predetermined waveform.

6. The method of claim 5 wherein said predetermined waveform window signal is a signal which includes an origin centered cosine of exponents greater than one portion, with said window signal selecting the initial impulse waveform portions of said tranducer device pressure impulse input signal and electrical output signal waveforms and excluding subsequent echo related portions of said waveforms.

7. The method of claim 5 wherein said predetermined waveform window signal is a signal defined by an exponential function of e, the base of the naperian logarithm.

8. The method of claim 5 further including processing said transfer computed frequency response function to exclude window signal induced frequency and amplitude components therefrom.

9. The method claim 1 wherein said step of computing the frequency response function includes computing the cross power spectrum of said pressure impulse input and electrical output signals of said transducer device.

10. The method of claim 1 wherein said step of generating the Fourier transform frequency components includes determining from the electrical response of an impulse force generating sensor element the Fourier transform coefficients for said pressure impulse signal.

11. Apparatus for characterizing the pressure wave input to electrical signal output response of an acoustic signal to electrical signal transducer device comprising the combination of:
    pressure impulse signal generating mechanical impact means for exciting the acoustic signal input port of said transducer device;
    means for determining the waveform characteristics of the pressure impulse signal received at said transducer input port;
    means including origin centered cosine function window signals for segregating the acoustic, echo fee time portions in both said transducer input port signal waveform and the electrical signal output waveform of said transducer device from the echo encumbered portions of said signal waveforms;
    means for generating the Fourier transform frequency components of said echo free pressure impulse signal and said electrical signal output waveforms over a predetermined range of Fourier frequencies;
    means for computing fro said transform frequency components the electrical signal output to acoustic pressure input frequency response function of said transducer device over said range of Fourier frequencies.

* * * * *

UNITED STATES PATENT AND TRADEMARK OFFICE
CERTIFICATE OF CORRECTION

PATENT NO. : 4,909,064

DATED : March 20, 1990

INVENTOR(S) : Richard D. Talmadge

It is certified that error appears in the above-identified patent and that said Letters Patent is hereby corrected as shown below:

```
Col 1, line 26, "calibration" should be ---calibrations---.
Col 1, line 32, "usefuL" should be ---useful---.
Col 2, line  4, "company" should be ---Company---.
Col 3, line  7, "siganl" should be ---signal---.
Col 3, lines 21-22, "calibrations" should be ---calibration---.
Col 3, line 64, "guage" should be ---gauge---.
Col 4, line 14, "FIG. 1/." should be ---FIG. 1.---.
Col 4, line 16, "100" should be ---110---.
Col 6, line 35, "be Vibra" should be ---be a Vibra---.
Col 6, line 47, "To" should be ---$T_0$---.
Col 6, line 48, "To" should be ---$T_0$---.
Col 6, line 67, "$T_D$" should be ---$T_0$---.
Col 7, line  6, "fo" should be ---of---.
Col 7, line 52, "strobascopic" should be ---stroboscopic---.
Col 7, line 58, "in FIG. 6" should be ---at FIG. 6---.
Col 7, line 66, "To" should be ---$T_0$---.
Col 8, line 28, "ration" should be ---ratio---.
Col 8, line 38, "pubished" should be ---published---.
Col 8, lines 48-49, "spectrum/analysers" should be
      ---spectrum analysers---.
```

UNITED STATES PATENT AND TRADEMARK OFFICE
CERTIFICATE OF CORRECTION

PATENT NO. : 4,909,064

DATED : March 20, 1990

INVENTOR(S) : Richard D. Talmadge

It is certified that error appears in the above-identified patent and that said Letters Patent is hereby corrected as shown below:

Col 9, line 12, "provide" should be ---provided---.

Col 9, line 48, "transsfer" should be ---transfer---.

Col 11, line 26, "So: v=3.9. $in^3$" should be

---So: v=3.93 $in^3$---.

Col 12, line 12, "under plurality" should be

---under a plurality---.

Col 12, line 39, "funciton" should be ---function---.

Col 13, line 16, "considering of alternate" should be

---considering alternate---.

Col 13, claim 1, line 12, "fromt he" should be ---from the---.

Col 14, claim 11, line 12, "fee" should be ---free---.

Col 14, claim 11, line 22, "fro" should be ---from---.

Signed and Sealed this

Twenty-first Day of January, 1992

*Attest:*

HARRY F. MANBECK, JR.

*Attesting Officer*     *Commissioner of Patents and Trademarks*